(12) United States Patent
Vinberg et al.

(10) Patent No.: US 8,495,557 B2
(45) Date of Patent: Jul. 23, 2013

(54) HIGHLY AVAILABLE LARGE SCALE NETWORK AND INTERNET SYSTEMS

(75) Inventors: Anders B. Vinberg, Kirkland, WA (US); David G. Campbell, Sammamish, WA (US); James R. Hamilton, Bellevue, WA (US); Donald F. Ferguson, Somers, NY (US); Emre M. Kiciman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 12/061,668

(22) Filed: Apr. 3, 2008

(65) Prior Publication Data

US 2009/0254552 A1 Oct. 8, 2009

(51) Int. Cl.
*G06F 17/30* (2006.01)
*G06F 12/00* (2006.01)

(52) U.S. Cl.
USPC ............................. 717/100; 707/6; 707/200

(58) Field of Classification Search
USPC .................................................... 717/121
See application file for complete search history.

(56) References Cited

U.S. PATENT DOCUMENTS

| | | | |
|---|---|---|---|
| 6,954,757 B2* | 10/2005 | Zargham et al. | 1/1 |
| 6,968,535 B2* | 11/2005 | Stelting et al. | 717/104 |
| 6,986,145 B2* | 1/2006 | Gangopadhyay | 719/316 |
| 6,993,743 B2 | 1/2006 | Crupi et al. | |
| 7,076,762 B2* | 7/2006 | Fisher | 717/102 |
| 8,019,632 B2* | 9/2011 | Niheu et al. | 705/7.11 |
| 8,069,437 B2* | 11/2011 | Aigner et al. | 717/109 |
| 8,225,282 B1* | 7/2012 | Massoudi et al. | 717/121 |
| 2005/0055667 A1* | 3/2005 | Beringer et al. | 717/108 |
| 2005/0144226 A1* | 6/2005 | Purewal | 709/203 |
| 2006/0080657 A1 | 4/2006 | Goodman | |
| 2006/0241931 A1 | 10/2006 | Abu el Ata et al. | |
| 2007/0061731 A1 | 3/2007 | Dillon et al. | |
| 2007/0118549 A1* | 5/2007 | Bornhoevd et al. | 707/101 |
| 2007/0157191 A1* | 7/2007 | Seeger et al. | 717/168 |
| 2007/0168925 A1* | 7/2007 | Bornhoevd et al. | 717/104 |
| 2007/0169103 A1* | 7/2007 | Bhatkhande et al. | 717/170 |
| 2007/0174810 A1 | 7/2007 | Hockenberry et al. | |
| 2007/0234282 A1* | 10/2007 | Prigge et al. | 717/107 |
| 2007/0234290 A1* | 10/2007 | Ronen et al. | 717/120 |
| 2009/0099882 A1* | 4/2009 | Karabulut | 705/7 |
| 2009/0172635 A1* | 7/2009 | Auriemma et al. | 717/107 |

OTHER PUBLICATIONS

Marchetti et al, "Enhancing Availability of Cooperative Applications through Interoperable Middleware", Journal of Information Science and Engineering, (2003), pp. 39-58.

Friese et al, "A Robust Business Resource Management Framework Based on a Peer-to-Peer Infrastructure", Seventh IEEE International Conference on E-Commerce Technology (CEC'05), 2005, pp. 215-222.

(Continued)

*Primary Examiner* — Don Wong
*Assistant Examiner* — Theodore Hebert
(74) *Attorney, Agent, or Firm* — Gonzalez Saggio & Harlan LLP

(57) ABSTRACT

Described is a technology by which a system corresponding to a large scale application is built from subsystems that are differentiated from one another based on characteristics of each subsystem. Example characteristics include availability, reliability, redundancy, statefulness and/or performance. Subsystems are matched to known design patterns, based on each subsystem's individual characteristics. Each subsystem's characteristics are associated with that subsystem for subsequent use in operation of the system, e.g., for managing/servicing the subsystem. The known design patterns may be provided in a library, in a programming framework, in conjunction with a development tool, and/or as data associated with one or more operating system services, server systems and/or hosted services that include at least one configuration, policy and or schema. Certain design patterns and/or characteristics patterns may be blocked to prevent their usage.

20 Claims, 5 Drawing Sheets

OTHER PUBLICATIONS

"The adoption and design methodologies of component-based enterprise systems", European Journal of Information Systems (2000), Operational Research Society Ltd., pp. 25-35.

"The Mentor Project: Steps towards Enterprise—Wide Workflow Management", Proceedings of the Twelfth International Conference on Data Engineering, Feb. 26-Mar. 1, 1996, pp. 556-565.

* cited by examiner

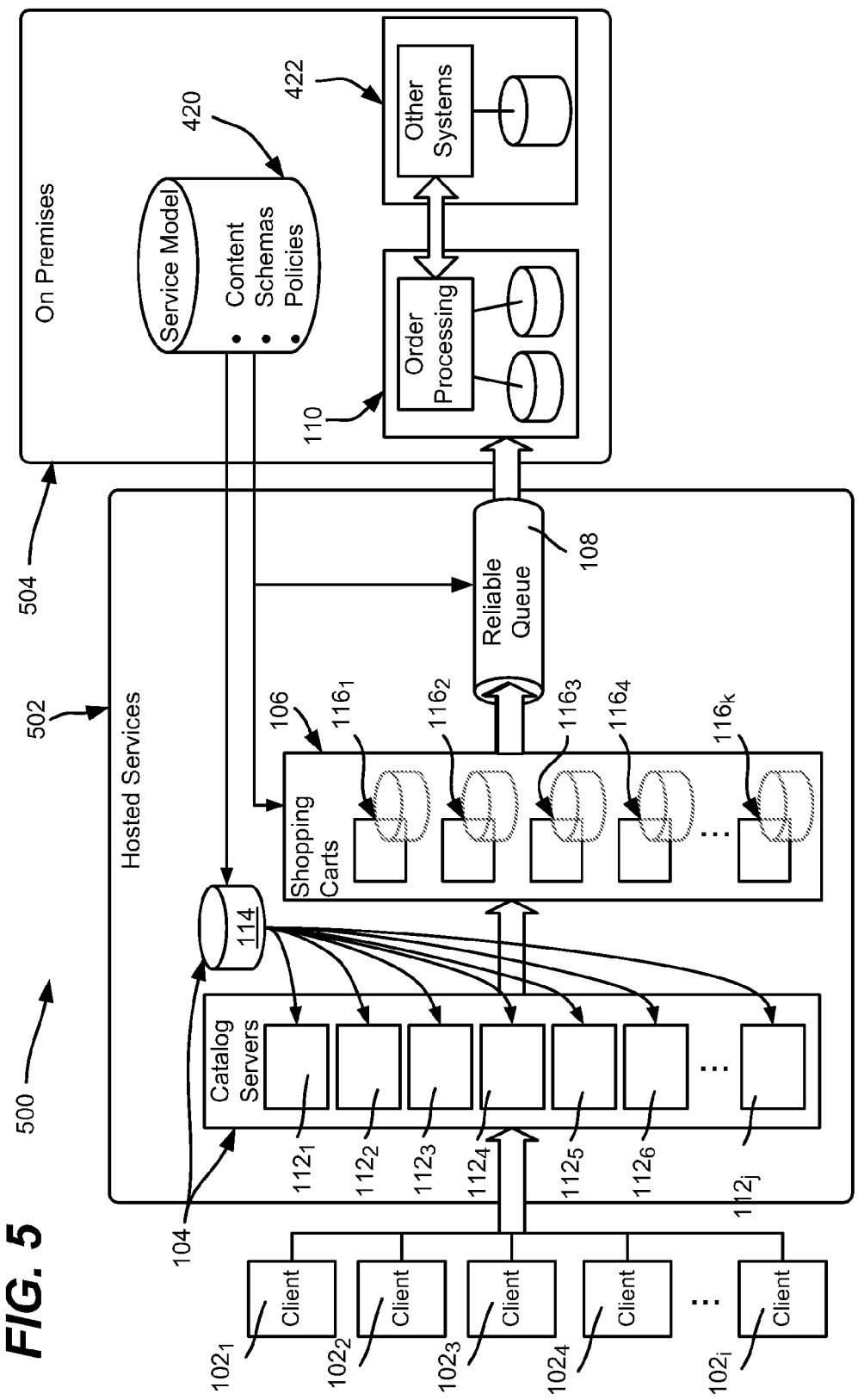

HIGHLY AVAILABLE LARGE SCALE NETWORK AND INTERNET SYSTEMS

BACKGROUND

Very large scale systems that provide services, such as Internet search systems and instant communications systems, are treated differently from conventional enterprise networking systems. For example, such very large scale systems are not only designed for a much larger scale, but have distinct characteristics, and are operated with specialized tools.

As enterprise IT environments evolve and move towards models in which software is a service, many common business applications need to be built in very large-scale versions. Further, many enterprises are deploying very large scale systems that have characteristics and service level requirements similar to those common in Internet services.

However, the tools currently used in enterprise IT environments are ill-suited for such large scale systems. Partly as a result, building a highly available, truly large-scale application today is more of an art than a science, whereby only a relatively small, elite number of designers with rare, specialized skills know how to build these types of systems. The scarcity of such designers and resultant expense are one reason that such large scale systems are not in the mainstream.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a system corresponding to a large scale application is separated into subsystems based on characteristics of each subsystem. Example characteristics include availability, reliability, redundancy, statefulness and/or performance. The system is designed by coupling the subsystems together, including for each subsystem matching a design pattern to that subsystem based on its characteristics. Each subsystem's characteristics are associated with that subsystem for subsequent use in operation of the system, e.g., for managing/servicing the subsystem.

A set of known design patterns may be provided, such as in a library of known design patterns, in a programming framework, in conjunction with a development tool that creates code from higher level descriptions, as data associated with one or more operating system services, server systems and/or hosted services that include at least one configuration, policy and or schema. Certain design patterns and/or characteristics patterns may be blocked to prevent their usage.

In one aspect, a system includes a plurality of subsystems, with each subsystem having associated characteristics data that match a design pattern by which the system is constructed. A management tool is coupled to (at least) one of the subsystems, and accesses data corresponding to the set of characteristics patterns associated with that subsystem to perform at least one management task. Example management tasks include deployment, configuration, policy compliance analysis and enforcement, health and service level monitoring, and/or repair and dynamic resource allocation.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is block diagram representing an alternative of example commerce application system in which part of the system is hosted as a service and part of the system is operated on premise.

DETAILED DESCRIPTION

Various aspects of the technology described herein are generally directed towards facilitating the analysis, design, construction and/or operation of very large scale, highly available systems. As described herein this may be accomplished via meta-patterns which, for example, facilitate the construction of tools, frameworks, system components and/or services that make such very large scale, highly available systems useable in mainstream IT environments.

While many of the examples herein are described with respect to an Internet commerce application/environment, it is understood that these are only examples, and virtually any large or very large system may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and very large scale systems in general.

A "design pattern" is a term that is widely used to describe a way to arrange components to build a system that addresses some specific requirement or requirements. For example, a system may need to be highly available and performant, and reliable in the protection of data. There are a few such known design patterns that are commonly used in very large systems, however there is no single common pattern that helps in the design of such systems, because different types of systems have very disparate requirements and data flows.

The technology described herein is in part based on the concept of a "meta-pattern," comprising a way of analyzing a system application including its data flows and requirements. As will be understood, a meta-pattern leads to identification of useful design patterns, and enables frameworks and tools for development and operations.

Figure 1:
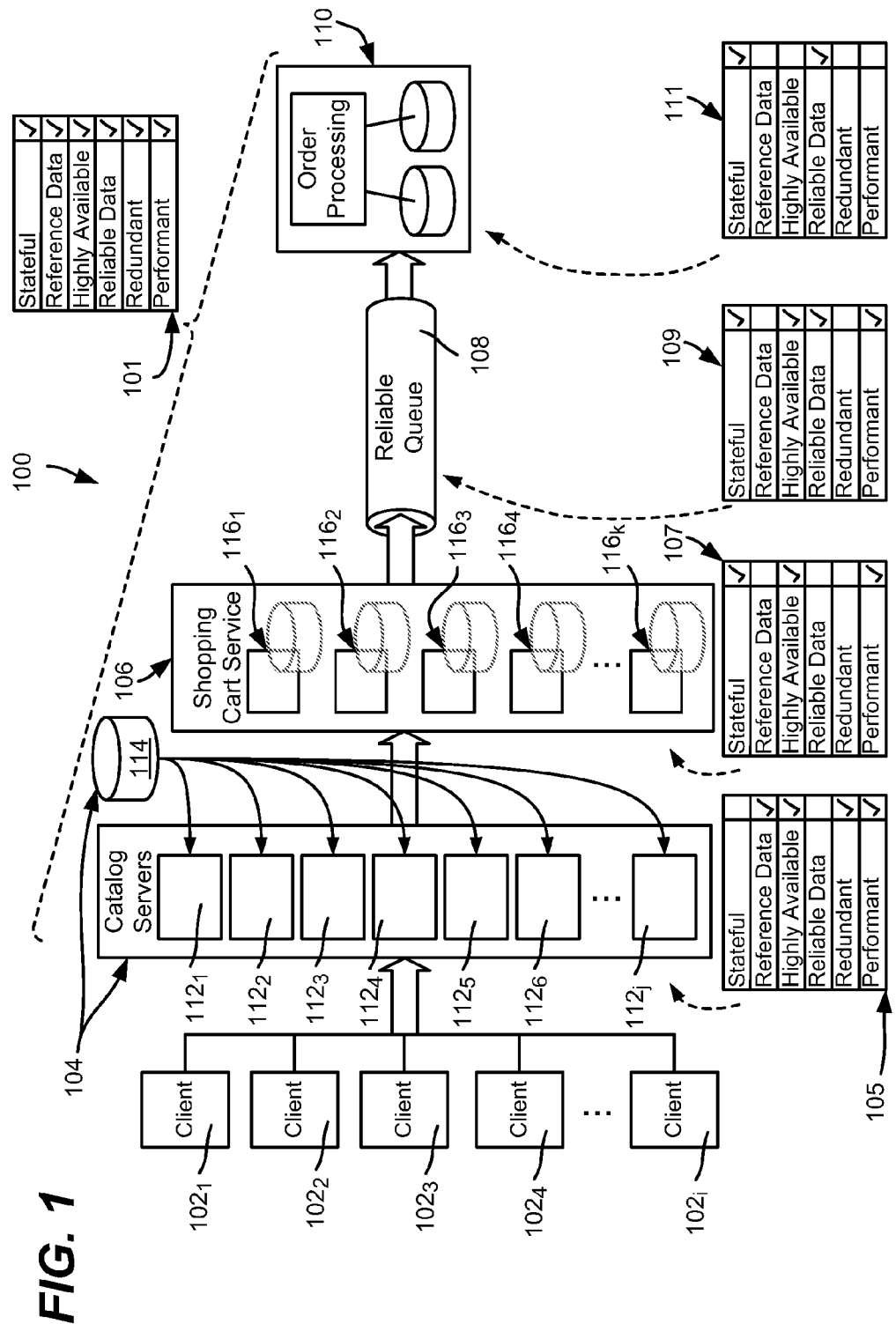
FIG. 1 is a block diagram representing an example commerce application system including various subsystems with associated characteristics.

By way of example, FIG. 1 implements elements of a meta-pattern in a commerce system 100 to which clients $102_1$-$102_i$ connect, e.g., to perform merchandising-related purchases. As can be readily appreciated, an ideal commerce system has all of the characteristics shown in table 101, namely it is stateful (maintains data), uses reference data, is highly available, has reliable data, includes redundancy, and is performant. However, the expense of designing, implementing and maintaining such an ideal system is (heretofore) beyond the resources of all but the largest enterprises.

As will be understood, instead of designing such very large systems as a whole, the technology herein describes identifying subsystems within a system based on workflows and characteristics. As exemplified below, each of these subsystems generally has a different set of desired characteristics (relative to one another), in which each set comprises a subset of the aggregate system's desired characteristics, and corresponds to a known design pattern. As a result, each subsystem may be designed with a design pattern that achieves only those characteristics that are desired for that subsystem, facilitating the use of tools, frameworks, system components and/or services based on those characteristics.

By way of example, the commerce system 100 of FIG. 1 includes a number of subsystems, including a catalog service 104, a shopping cart service 106, a reliable queue 108, and an order processing service 110. Each of these subsystems has a set of desired characteristics associated therewith, as exemplified by the tables 105, 107, 109 and 111, respectively, (with the associations represented by the dashed arrows).

The example catalog service 104 comprises a stateless, scale-out server farm (represented by catalog servers $112_1$-$112_j$) that is populated with reference data from a central catalog database 114. In a catalog service 104 of a commerce application subsystem, the central catalog database 114 is of reasonable scale and can be hosted on a single database server. Further, the catalog servers $112_1$-$112_j$ are refreshed independently with no need for cross-machine synchronicity; high availability and fast response are generally necessary for a successful catalog service. Thus, in FIG. 1, the set of required characteristics in table 105 associated with the exemplified catalog service 104 are represented by the checkmarks, and include the need for reference data in a service that is highly available, redundant and performant.

Also represented in the commerce system 100 of FIG. 1 is the shopping cart service 106 represented by a set of stateful servers $116_1$-$116_k$ (including storage), each stateful server handling one partition of the user namespace. In this example, the stateful servers $116_1$-$116_k$ share nothing, with simple load balancing performed, e.g., if the load exceeds the allocated resources, an additional server is allocated and takes over its share of the workload.

One way of arranging a shopping cart service is to specify that server reliability is not a requirement, e.g., in a commerce application, if a shopping cart server goes down, a fraction of the users lose their shopping cart. The other servers will take over the workload, however the afflicted users have to start over. This may provide significant advantages with respect to cost and performance, at the risk of some occasional customer frustration. Thus, in FIG. 1, the set of example characteristics (table 122) associated with the exemplified shopping cart service 110 include stateful, highly available and performant, but not reliable data.

As can be readily appreciated, the cost savings and simplification resulting from not requiring reliable data may be worth the risk in many system scenarios. However, if the risk of data loss is deemed unacceptable, another, more expensive design pattern may be used.

Another subsystem, comprising the order processing service 110, needs to be highly reliable, as orders are the central value of any commercial business. However, the order processing service 110 does not need to respond in real time, nor provide high availability, as long as it can keep up with the long-term average workload. Thus, for example, a suitable order processing service 110 may be based on a classical scale-up database server, with reliable transaction processing, that is clustered for reliability. In FIG. 1, the set of example characteristics (table 111) associated with the exemplified order processing service 110 include stateful with reliable data.

Overall system transaction reliability is handled by the reliable queue 108 between the shopping cart service 106 and the order processing system 110. The reliable queue 108 needs to provide high availability and meet performance requirements, however its processing is extremely simple, without complex transactions. Associated characteristics (table 109) thus include stateful, highly available, reliable and performant.

As can be readily appreciated, the overall commerce system 100 design exemplified in FIG. 1 is greater than the sum of its parts. As a whole, the system/commerce application is scalable, and is stateful, provides reference data, is highly available, reliable, redundant and performant, (table 101), although none of its component subsystems individually exhibit this full set of characteristics.

As can be seen, the system 100 has an application architecture that is rich and complex, however each subsystem is relatively simple, whereby cost savings is significant. Other advantages with respect to analysis, design, construction and/or operation are facilitated, as are the use of tools, frameworks, system components and/or services. In this particular design example, the business model is adapted to fit the processing architecture, by introducing a gap between acknowledgement of the placement of the order (pre-queue) and acceptance of the order after credit card validation and inventory check (post-queue). This example design works for this particular business model because each customer is independent, global relationships do not affect transaction processing (they affect only inventory management and business reporting), and the shopping cart tolerates unreliability while order processing tolerates latency.

As can be readily appreciated, the architecture of FIG. 1 is not a general pattern, but is only an example of a suitable pattern for one business model and its associated commerce application, made up of subsystems with specific characteristics that suit the specific business model. Other applications need different patterns. For example, one application may exploit strict namespace partitioning, while others need a single-image database with global relationships. As other examples, some applications need to respond in real time, while others can handle long latency; some are almost entirely read-focused, while others do complex write transactions. As yet another example, some applications need to follow traditional ACID semantics with strong accuracy guarantees, while others are not concerned with accuracy, (e.g., "other buyers of this book were also interested in . . . " type of systems). Some applications decline a conversation rather than respond slowly, while others provide best-effort service for any request. Some applications can be lossy, discarding parts of the data stream in the interest of timeliness while others cannot; some applications may be stale, managing latency depending on the volatility and importance of each data category.

There are thus many fractured and complex variations that prevent identifying a common design pattern. Nevertheless, a universal meta-pattern is provided as described herein. To this end, such a meta-pattern includes analyzing the steps in the business workflow, such as from the perspective of statefulness, availability, reliability, responsiveness, staleness, accuracy and/or lossiness; still other characteristics may be considered.

Thereafter, as generally described below with respect to FIG. 2, for each step, a design pattern is identified that includes the appropriate combination of characteristics, with a subsystem chosen or built based on that design pattern. The aggregate system/application is assembled from those subsystems, using an interconnect fabric that itself supports the characteristics of the application as a whole. Note that while the aggregate system is based on service-oriented architecture principles, the details of the messaging infrastructure are adapted to varying requirements. For example, connections among data centers, machines and local components are likely optimized differently.

In sum, while an entire application with its diverse requirements seems complex, simplification is achieved via a meta-pattern of assembling a given application from simpler subsystems that are each designed to do certain tasks very well, while ignoring other requirements. The meta-pattern involves the balancing of availability, accuracy, staleness, lossiness, reliability, timeliness, response time, and so forth, making tradeoffs in subsystem design in order to meet the requirements of the aggregate system.

Figure 2:
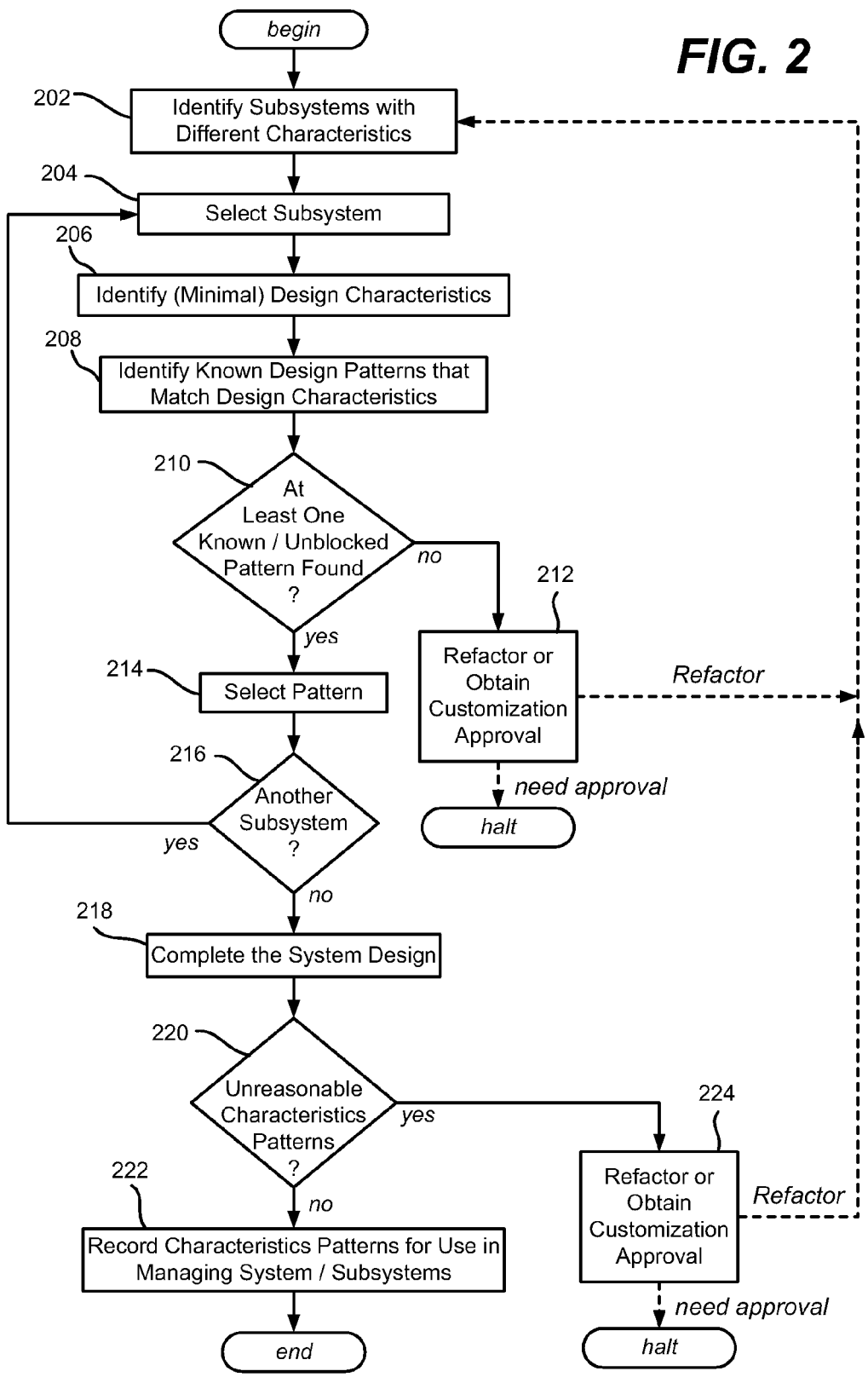
FIG. 2 is a flow diagram showing various example meta-pattern steps taken to design and implement a very large scale system comprising separate subsystems.

Turning to FIG. 2, for a system (e.g., a particular application and/or service) to be designed, the required information flow and operational characteristics are analyzed, e.g., by a designer possibly assisted by a design tool. For example, as represented by step 202, a set of subsystems are identified, such as with different characteristics from the perspective of statefulness, availability, performance, data reliability, transaction complexity and other such characteristics. Note that there is no comprehensive list of such characteristics, and other operational characteristics currently exist or will be defined in time.

One part of any design is considering the connection fabric that assembles the entire service from the subsystems. This connection fabric is treated as a subsystem by itself, with its own operational characteristics.

Further note that a system may be designed that includes or uses an existing service. In such an event, the existing service is considered as a fixed subsystem, e.g., its characteristics profile is noted, it is marked as not subject to modification, and the design process proceeds as described herein.

After separation, an implementation may be chosen by matching each of the characteristics patterns with a known design pattern, and based on other considerations described herein. For example, as represented by step 204, once separated into subsystems, a given subsystem is selected. No particular order for selecting the subsystems is required, although some consideration may be given as to which subsystems appear to be more complex than others, so that, for example, any subsystem that are impractical, unfeasible, overly expensive and/or the like can be determined more early in the design process.

As part of the separation process, characteristics for each subsystem are identified, such that the characteristics may be put into a data structure (e.g. a table form or the like as in FIG. 1) at step 206. Typically the characteristics are the minimal ones required for implementing the subsystem, as even a single unnecessary characteristic may increase the cost of the implementation. Note that if all subsystems are simply marked as having all characteristics and all requirements, there may be no possible implementation.

However it is possible that a characteristic that is unnecessary is still desired, (e.g., make shopping cart data reliable even though the service may operate without such reliability). Thus, while identifying minimal design characteristics may be a starting point, careful consideration of each characteristic with respect to cost and customer desires is performed when selecting a subsystem's characteristics.

At step 208, any known design patterns that match the pattern of characteristics identified (in steps 202 and 206) are identified for the currently selected subsystem. Then, step 210 evaluates whether at least one known pattern was found at step 208. Note that many characteristics patterns may not have a corresponding design pattern. For example, if a design for a type of system has five possible operational characteristics and each is binary, (such as stateful: yes or no, and four other binary characteristics), there are thirty-two possible design patterns; however only twelve or so design patterns may be known for systems of this type, leaving twenty characteristics patterns as unimplemented or unable to be implemented. Further, although a particular design pattern may exist, it may be specifically blocked for this design, such as a result of known subsystem expense that exceeds a given budget, development timeframe issues, or known incompatibility with another part of the system. Step 210 also may detect such blocked patterns.

It should be noted that while a binary yes/no for a characteristic provides a straightforward design pattern matching mechanism, alternative mechanisms may be provided. For example, a characteristic may be made more granular, such as via a decimal or other value; zero may indicate a characteristic is not wanted, while ten may indicate desired to the extent possible, with various other levels represented by values in-between zero and ten. By way of example, "reliable data" may be needed, but reliability is not perfect, with costs increasing the more reliable the storage; a value may indicate how much the user is willing to pay for reliability in a given subsystem, which a designer may trade off against other scores to meet a budget. As another example, "highly available" may be a needed characteristic, but may be scored from zero (not needed) to two (always needed regardless), with one indicating always needed, yet allowing for one or more specific exceptions (e.g., carefully planned subsystem servicing).

As represented by step 212, if no known design pattern matches the characteristics profile of a subsystem, that is an indication that the design may be ill-chosen; it may not be possible to build a subsystem that matches those characteristics, or it may be overly expensive to do so since the whole subsystem has to be invented from scratch instead of reusing known designs. If so, it may be necessary to revisit the analysis in step 202, refactoring the design.

Note that refactoring is a familiar step in system design, however the technology described herein provides significant advantages in that it explicitly identifies the possible need for refactoring, and further, the refactoring process itself in which the characteristics patterns are reconsidered are built into the design process. If no alternate design can be found, the cost and risk of building the desired system is higher than if the system fit into common design patterns, whereby further customer approval/renegotiation of the requirements with the business customer is generally appropriate. For example, a customer may be given an option that removes a desired (but not necessary) characteristic so that a subsystem's characteristics then match a common design pattern, making the system affordable.

It is possible that more than one known design pattern may match a characteristics pattern. If so, as represented by step 214, one may be chosen based on performance, experience with the design, availability of licensed or licensable technology and so forth, and/or the cost of development, test, servicing or operations and so forth. A customer may also be given the opportunity to make such a decision. Step 216 repeats the process for other subsystems.

With respect to known design patterns and the services that implement them, design patterns that are candidates (e.g., on the order of ten to twelve) may be delivered as components in some form, as further described below with reference to FIG. 3. For example, a common "Reference Data" pattern used in a typical catalog service 104 includes specific data replication functions, including automatic synchronization on startup for dynamic resource allocation and for repair through restart, and opportunistic synchronization for intermittently connected mobile devices. Note that a possible pattern such as "Client-Side Caching" may be too broad a pattern, e.g., because "Reference Data Caching" is different from "Transaction Data Caching." Further note that design patterns for storage apply to new storage technologies.

Another common data management pattern is referred to as "Non-Persistent Session State" implemented through an in-memory database, which contemporary hardware has made practical. For example, in the shopping cart service 106, the data may be held in memory that is not protected against failure. The service 106 is scaled out with strict namespace partitioning and simple load balancing. If a server (e.g., 106₁) fails, a portion of the data is lost, and the incoming load is re-balanced among the existing servers 106₂-106ₖ); when the failed server 106₁ comes back online, it negotiates to take over a share of the load.

A variant is the "Reliable Session State" implemented through a redundant in-memory database. This adds reliability through redundant data replication while avoiding the performance bottleneck of disk persistence, e.g., if one server fails, its data remain available (typically spread out over several servers to avoid hotspots). While the failed server is offline, the remaining servers redistribute the data and workload, and eventually the failed server is brought back online or replaced and picks up its share of the workload.

Other important patterns revolve around the interconnect fabric. One common pattern is the "Reliable Queue" as exemplified in FIG. 1; variations include batched delivery instead of item-by-item, which trades latency for efficiency. Such a queue service can be extended with adapters that link to services with different availability characteristics, e.g., as in the example of FIG. 1, where the order processing service is transactionally reliable but not highly available.

Note that the above are only a small number of examples of possible patterns. Many such patterns may be accommodated, and there is no dependency on any specific characteristics or any implementation of any specific pattern.

Returning to FIG. 2 and as represented by step 218, when the design patterns are matched, the design of the system proceeds towards completion, taking into account other conventional considerations. For example, the resultant cost, schedule and risk that emerge from the design candidate from this run of the process may lead to renegotiating business requirements and/or refactoring the entire design, in order to optimize the entire process.

In completing the design, step 220 evaluates whether there are any unreasonable characteristics patterns. Unreasonable characteristics patterns (which also may be detected at step 210) are generally described below, but in this example process are also looked for at step 220. For example, it is possible that following step 210, a customer may approve a custom design pattern for a characteristics pattern that turns out to not be feasible in a given system, and/or a characteristics pattern may be incompatible in some way with another part of the system.

If there are no unreasonable characteristics patterns, at step 222 the characteristics patterns are recorded with the system, for later use by operational/management systems. In one implementation, a model describing the service is created, identifying its subsystems and their connection topology (such a model is useful for many reasons, such as described in model-based management and model-based development references). In general, the parts of the model that represent the subsystems are annotated with their operational characteristics. When the service is built and delivered for deployment and operations, the model with the characteristics may be included as part of a manifest or the like for each subsystem. Then, during operation, the model is loaded into a repository, which makes the characteristics pattern available to operational systems. In a simpler implementation, there is no complete model, however the characteristics patterns are made available to operational systems in some other form.

For example, once associated with the subsystems of a system, operational/management systems may use the characteristics patterns to identify workflows to be used for operational tasks. As a more particular example, if it is known that a subsystem is stateless and highly available, an automated program (or administrator) may service the system through a "rolling patch" process, shutting down one server at a time, servicing it, and restarting it before moving on to the next server. In another example, if a stateful and not redundantly scaled out subsystem service does not require continual availability, a maintenance window can be chosen during which the entire subsystem is shut down, serviced as quickly as possible, and restarted.

Returning to step 220, if an unreasonable characteristics pattern appears, a management system may not be able to accommodate it. For example, if a subsystem is stateful, does not use any kind of redundancy technique, bus is required to be continually available, there does not appear to be an operational workflow that permits servicing it. Such an operational blockage is one possible reason that no known design pattern may match the desired characteristics pattern, (as discussed above with reference to step 210). As can be readily appreciated, one advantage of the technology described herein is that because operational characteristics are considered within part of the overall design process, the choice of a design pattern is guided. This is in contrast to a conventional development process, where operational requirements are unknown or ignored, such that once built the operations staff has to do the best they can with a system, after it is too late to provide their requirements back to the designers.

Thus, step 220 may assist in the operations part of the process, in which design or development tools may block certain design patterns. This blocking may be made at step 220 (in addition to that at step 210 as described above, where available design patterns are matched to required characteristics patterns and detected if non-existent or inappropriate and blocked for a type of system), so that any custom overrides and/or combinations of subsystems may be considered. At either or both step 210 and 220, such characteristics patterns and/or design patterns that are known to be unreasonable (and have been marked as blocked) are identified, instructing the designer to refactor the design or obtain specific approval before attempting to design a solution that implements that characteristics pattern. Note that even if there is no known design pattern that exists for a characteristics pattern, a particular characteristics pattern may be specifically identified and similarly blocked, so that, for example, a designer is not tempted to try to construct a design pattern where one is non-existent for a characteristics pattern; the designer may not recognize that this has been analyzed before and deemed improper for this particular type of design and/or budget. Alternatively, as described above, a design pattern may exist for a characteristics pattern, but may be blocked for a certain type of system and/or cost target.

As can be readily appreciated, the design process may be a redesign of an existing system, whether the system was built according to the meta-pattern described herein or not. For example, when an existing service was designed and built via the example processes described herein, the characteristics patterns are known and the redesign process can proceed as described above, such as to add another desired characteristic to a subsystem at a later time when more financial resources are available. If the existing system was not designed as described herein, its characteristics patterns may be deduced in a forensic process, such as by having designers study the architecture and/or interviewing the developers and operations staff. As part of an optimization process, when choosing among multiple available design patterns (step 214) or considering refactoring the design (steps 212 and/or 224), the cost of changing existing systems is generally considered, particularly for existing systems that were not designed as described herein, e.g., via subsystems corresponding to design patterns selected via characteristics patterns.

Figure 3:
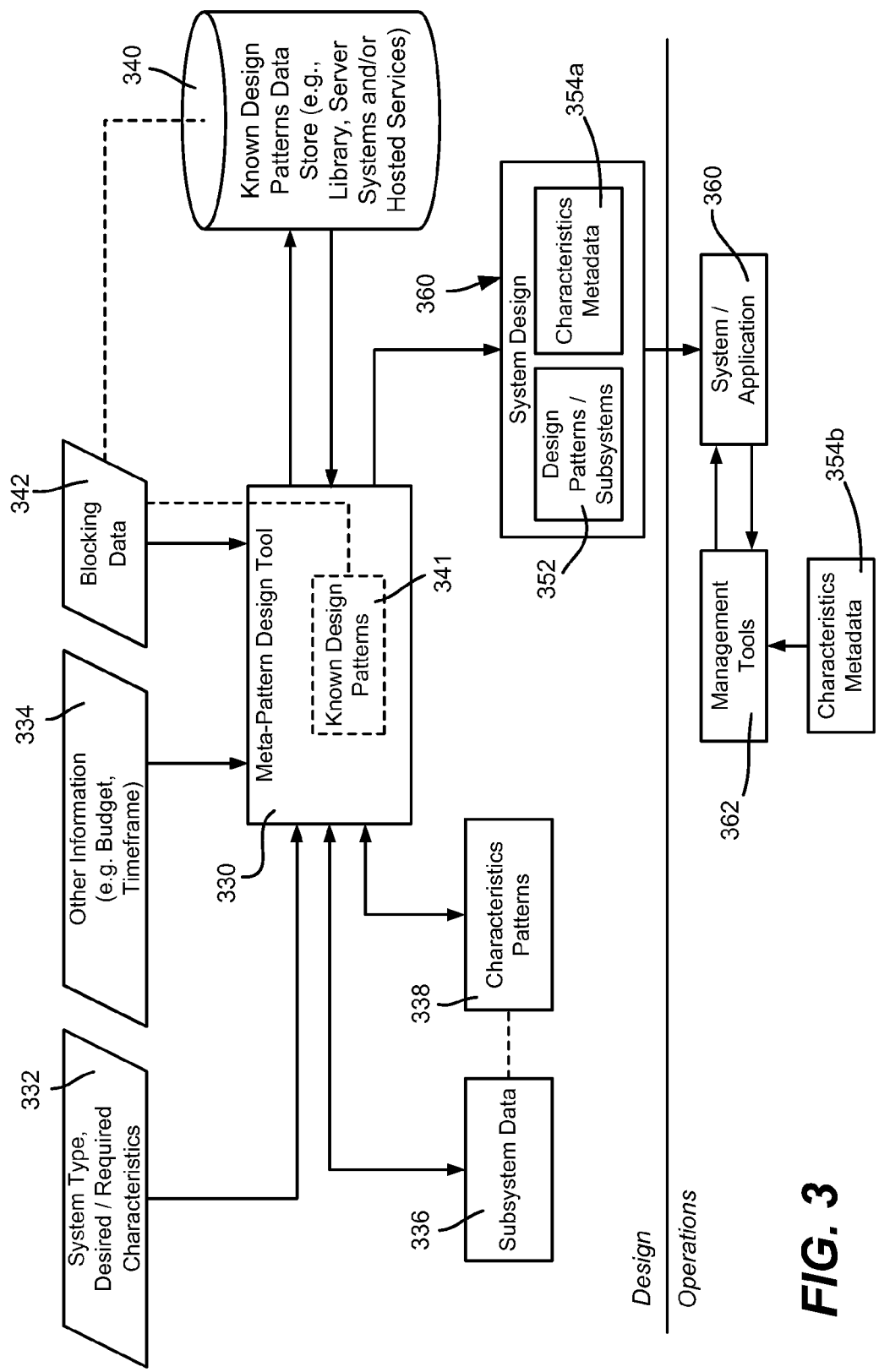
FIG. 3 is block diagram representing the design and operation of a system including various subsystems with associated characteristics.

FIG. 3 summarizes the meta-pattern-based design of a system. A designer, possibly assisted by a design tool 330, accesses information 332 such as the system type, the required characteristics of that system, and any desired characteristics, e.g., those not necessary to implement such a system, but desired by a customer. Other information 334 such as budget and timeframe data is provided for additional consideration. As can be readily appreciated, the design tool 330 may range from a simple user interface that provides a designer with simple data input and output operations to a sophisticated mechanism that runs many iterations, performs cost analyses, and so forth.

With this information, the designer (or designers) separates the system into subsystems based on characteristics, as represented in FIG. 3 by subsystem data 336 and characteristics patterns 338. As described above, the characteristics patterns are matched to known design patterns, e.g., in a data store 340 such as arranged as a design pattern library and/or server systems that are customized with configurations, policies and schemas or the like (described below with reference to FIG. 4), or hosted services that are customized with configurations, policies and schemas or the like (described below with reference to FIG. 5). For example, because scale problems are related to data management, at least some of the patterns may be delivered as components of database management systems, such as Microsoft SQL Server.

Further, other ways of providing known design patterns (as well as blocking data) are available, as represented by the dashed block 341. For example, design patterns may be delivered in the form of components in a programming framework, in the form of development tools that create appropriate code from higher level descriptions, and/or in the form of operating system services that are customized with configurations, policies and schemas.

As described above, blocking data 342 may be used to prevent usage of certain design patterns and/or avert customization attempts for characteristics patterns that are recognized as unacceptable characteristics patterns, in general or for this particular design. Some or all of the blocking data 342 may be maintained in the data store 340 or as part of the known design patters 341, as indicated by the dashed lines connected to the blocking data 342.

To summarize, the services including design patterns (and/or blocking data) may be delivered in various forms. For example, one way to deliver such functionality and data is to include them in a programming framework. The framework service may be supported by tools and templates in development tools. Some services may be so general that they can be used without any code, with only some configuration. Such general services may be delivered as operating system roles, as specific versions of an operating system (e.g., Windows® Server) or as separate server products. This reduces opportunities for errors and simplifies deployment and dynamic resource management (on-demand scale-out).

As is understood, designing the common patterns and the tools and services that implement them may involve trading off various requirements. For example, with respect to choosing the right level of generality, if the requirements are too constrained, the applicability is limited, whereas if too general, the programming model becomes unduly complex. If the requirements are too specific, an impractically large catalog of patterns is created, while if too general, too much tuning and specification are required, which makes usage difficult. Defining interfaces that accommodate multiple schemas and calculation models while fitting into the general application pattern are also aspects of tool design.

With respect to resilience and hardening aspects, when building a highly available system, a designer does what is possible to harden components, e.g., by carefully selecting an operating system and database. Many server failures are caused by mis-configuration; to avoid mis-configuration designers attempt to keep the environment disciplined. Notwithstanding, with sufficiently large-scale systems, faults are inevitable, whereby hardening alone does not achieve high availability.

As a result, resilience is required for high availability, e.g., based on recovery-oriented systems and/or redundancy. These designs depend on the state characteristics of the subsystem, which in turn relates back to the meta-pattern analysis described herein. For example, if a system in a scaled-out, redundant service fails and is restarted or replaced, it should recover automatically, negotiating with its peers and pick up its share of the workload (not necessarily the same share it had, since the other servers will have renegotiated load sharing while it was out).

This allows a system to be set up for automatic restart if it crashes, and further, allows for a health and performance monitoring system to respond to any poor behavior by recycling the server. While the monitoring system controls the process, the application server logic itself takes care of restarting. Note that rather than simply forcing an application or server restart, this architecture allows the management system to attempt lighter-weight recycling and incrementally escalate if the fix does not work. For example if restarting the application does not work adequately, rebooting the server may provide the solution. If still inadequate, reimaging the server may be attempted; at the extreme, the hardware may be replaced.

In scale-down configurations, the concept of resilience applies to clients as well as scale-out servers. If a client has no irreplaceable state, a system may respond to any failure (or anticipated failure) by replacing hardware and migrating software and data. Instead of diagnosing the cause of a fault on a live business client, an IT department simply replaces the device and diagnoses the problem later.

The meta-pattern needs to accommodate such a concept, identifying a read-only state that is replicated from the server (both static reference data such as price lists, and current data such customer order history and inventory levels) and treating that differently from data that is entered on the client. Client-originated data needs to be replicated to the server or persisted on reliable removable storage; reference data is to be pre-cached based on a context-aware prioritization.

Figure 4:
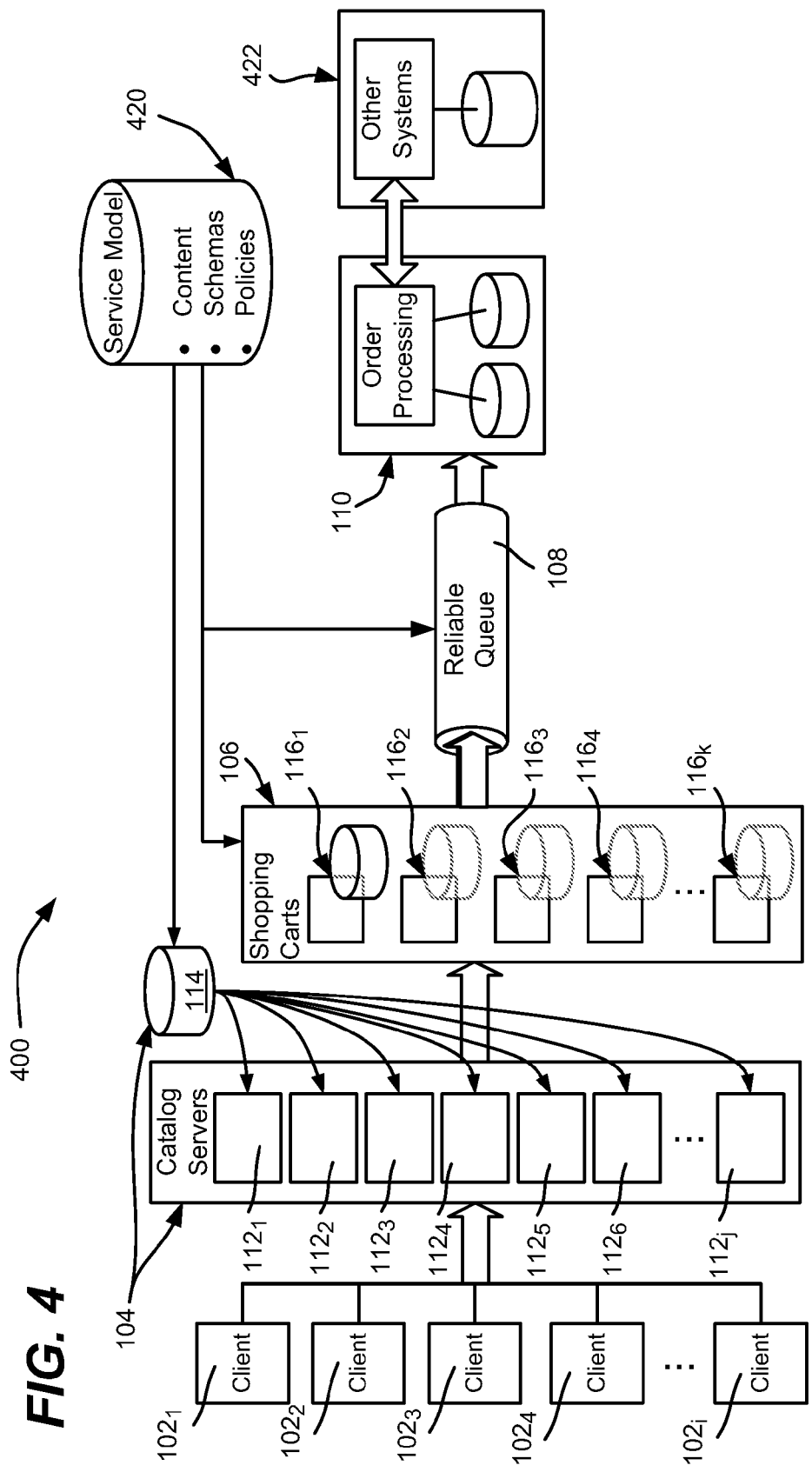
FIG. 4 is block diagram representing an alternative of example commerce application system in which custom code may be installed.

Turning to FIG. 4, a hybrid variant extends the server-role-configuration by permitting the installation of custom code for specific purposes, e.g., from stored procedures to partitioning algorithms. For example, a hybrid variant architecture (system 400) includes a service model 420, such as to define the content, schema and/or policies that are used by the subsystems (the services 104, 106 and 108 in this example). FIG. 4 also represents other systems 422 coupled to the order processing service 110.

FIG. 5 exemplifies how a system may be partitioned into separate services along one or more subsystem boundaries, which in this example provides for service delivery as a hosted service of an overall commerce application/system. More particularly, the more general services, such as those with the least active data management, may be provided as a hosted service 502 by a service provider. Using the example commerce application/system architecture, the front-end catalog service 104 comprises simple, stateless web servers with content populated from a single source, with low update frequency, corresponding to a classical web site. The shopping cart service 106 and the reliable queue 108 have no initial state, and are defined only through their schema. As a result, outsourcing these services to a hosted service provider is straightforward, which may be attractive to businesses as they require high availability and on-demand resource allocation, something a large-scale host is typically good at but many businesses find challenging.

In contrast, the order processing service 110 is more like a classical transaction processing application, does not require high availability, and likely has close integration requirements with other business applications. In such a situation, an on-premises deployment 504 may be preferred.

Such a hybrid system configuration, with one part 502 of the application outsourced and the other part 504 on premises is difficult to build and manage in a general case, e.g., because the interfaces between components are complex, and tuning and troubleshooting an aggregate system is a challenge. However, with an architecture based on subsystems with characteristics patterns as described herein, each component has well-known characteristics, and service requests follow well-known contracts and have well-known load behaviors. Separation along subsystem boundaries based on their types and characteristics is thus relatively straightforward. Indeed, hosting such well-defined services is likely easier for the host service than hosting arbitrary third-party applications.

Returning to FIG. 3, when acceptable design patterns are found for subsystems and their characteristics patterns, the result is an overall system design 350. This includes the set of design patters/subsystems 352 from which actual subsystem components may be assembled, along with characteristics metadata (maintained in some data structure 354*a*) for managing those subsystems, e.g., a model, manifest and/or other associated data by which operational tools may perform maintenance, upgrades and so forth as described herein.

For example, as represented in the operations section of FIG. 3, if the system design 350 is implemented as an actual system/application 360, management tools 362 may be provided for deployment, configuration, policy compliance analysis and enforcement, health and service level monitoring, repair and dynamic resource allocation, and/or other functions. The management tools 360 are guided by the characteristics metadata (maintained in some data structure 354*b*) that were identified in the design and provided to the management system 362 as attributes of a system model.

Turning to aspects related to scalability and availability, these aspects are mutually interdependent. For example, the larger the scale, the greater the number of decisions to be made, the greater the odds of system failures, and the greater the need for automatic availability management. Under a recovery-oriented paradigm, the central recovery technique used for high availability is to recycle or replace a failed system; seamless replacement of a failed resource is the same as seamless addition of a needed resource.

With respect to management at a large scale, very large scale data centers traditionally have been out of scope for conventional management systems. For example, their applications have unique characteristics, requiring customized management tools that exploit those characteristics. However, such customization is not desirable for systems as designed herein for adoption in mainstream environments, and thus support for existing and/or widely deployable management applications is desirable.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining, by at least one processor, a meta-pattern of an application by identifying subsystems of a system corresponding to the application, each of the subsystems comprising one or more characteristics associated with the each subsystem, the one or more characteristics including at least one of availability, reliability, redundancy, statefulness or performance;
   separating the one or more characteristics associated with the each subsystem into a data structure, wherein the one or more characteristics associated with the each subsystem are identified in the data structure as either a minimally required characteristic or a desired characteristic;
   for each subsystem, determining whether a known design pattern that matches the one or more characteristics associated with the each subsystem exists;
   responsive to a determination that the known design pattern that matches the one or more characteristics for the each subsystem does exist, providing a design of the system by coupling the subsystems corresponding to each subsystem's design pattern using a connection fabric and associating the one or more characteristics for the each subsystem with that subsystem, wherein the connection fabric is a subsystem; and
   responsive to a determination that either the known design pattern that matches the one or more characteristics for each subsystem does not exist or is blocked, identifying a need for refactoring the design of the system.

2. The method of claim 1 wherein identifying the known design pattern comprises accessing a library of known design patterns.

3. The method of claim 1 wherein identifying the known design pattern comprises accessing components in a programming framework.

4. The method of claim 1 wherein identifying the known design pattern comprises accessing data associated with a development tool that creates code from higher level descriptions.

5. The method of claim 1 wherein identifying the known design pattern comprises accessing data associated with one or more operating system services that include at least one of a configuration, policy or schema.

6. The method of claim 1 wherein identifying the known design pattern comprises accessing data associated with one or more server systems that include at least one of a configuration, policy or schema.

7. The method of claim 1 wherein identifying the known design pattern comprises accessing data associated with one or more hosted services that include at least one of a configuration, policy or schema.

8. The method of claim 1 wherein identifying the known design pattern that matches the one or more characteristics for each subsystem comprises accessing data corresponding to at least one design pattern that is blocked, or at least one characteristics pattern that is blocked, or at least one design pattern and at least one characteristics pattern that are blocked.

9. The method of claim 1 wherein associating the one or more characteristics for each subsystem with that subsystem comprise maintaining the one or more characteristics in a data structure, and further comprising:
accessing the data structure via one or more management tools for at least one of deployment, configuration, policy compliance analysis and enforcement, health and service level monitoring, or repair and dynamic resource allocation.

10. In a computing environment, a system comprising:
one or more processors;
a memory communicatively coupled to the one or more processors;
a plurality of subsystems implemented on the one or more processors, each subsystem of the plurality of subsystems having characteristics data associated therewith corresponding to a set of associated characteristics patterns that match a design pattern, the subsystems constructed via the design patterns into the system, wherein the characteristics data includes at least one of availability, reliability, redundancy, statefulness or performance, and wherein the characteristics data associated with the plurality of subsystems include at least one of minimally required characteristics for the each subsystem or desired characteristics for the each subsystem; and
a management tool coupled to one of the subsystems, the management tool accessing data corresponding to the set of characteristics patterns associated with that subsystem to perform at least one management task on that subsystem comprising at least one of deployment, configuration, policy compliance analysis and enforcement, health and service level monitoring, or repair and dynamic resource allocation.

11. The system of claim 10 wherein the associated characteristics data comprises a characteristic related to statefulness, availability, reference data, redundancy, performance, reliability, responsiveness, staleness, accuracy, or lossiness, or any combination of characteristics related to statefulness, availability, reference data, redundancy, performance, reliability, responsiveness, staleness, accuracy, or lossiness.

12. The system of claim 10 wherein the associated characteristics patterns include data comprising cost data, schedule data or risk data, or any combination of cost data, schedule data or risk data.

13. The system of claim 10 wherein the system is divided into at least two parts, including at least one part comprising one or more subsystems implemented in a hosted service remote from at least one other part of the system comprising one or more subsystems.

14. The system of claim 10 wherein one of the subsystems comprises an interconnect fabric, or wherein one of the subsystems comprises a reliable queue, or wherein one of the subsystems comprises and interconnect fabric and one of the subsystems comprises a reliable queue.

15. The system of claim 10 further comprising a service model that provides content, schema data or policy data, or any combination of content, schema data or policy data for at least one subsystem of the system.

16. The system of claim 10 further comprising a design tool that associates a characteristics pattern with a subsystem.

17. The system of claim 16 wherein the design tool matches a characteristics pattern with a subsystem based on a design pattern, and wherein the design patterns are provided in a library, in a programming framework, in a development tool, in one or more operating system services, in one or more server systems or in one or more hosted services, or in any combination of a library, a programming framework, a development tool, one or more operating system services, one or more server systems or one or more hosted services.

18. The system of claim 16 wherein the design tool matches a characteristics pattern with a subsystem based on a design pattern, and wherein the design tool accesses blocking data indicative of at least one blocked data pattern, or at least one blocked characteristics pattern, or indicative of any combination of at least one blocked data pattern and at least one blocked characteristics pattern.

19. In a computing environment, a method comprising:
managing, by at least one processor, at least some of the subsystems of a system, wherein each subsystem is associated with a characteristics pattern and corresponds to a design pattern selected based on the characteristics of that subsystem, wherein the characteristics include at least one of availability, reliability, redundancy, statefulness or performance, wherein managing comprises using the characteristics pattern associated with a subsystem to service that subsystem, and wherein the characteristics pattern associated with the each subsystem include at least one of minimally required characteristics for the each subsystem or desired characteristics for the each subsystem.

20. The method of claim 19 wherein managing includes configuration, policy compliance analysis and enforcement, health and service level monitoring, or repair and dynamic resource allocation, or any combination of deployment, configuration, policy compliance analysis and enforcement, health and service level monitoring, or repair and dynamic resource allocation.

* * * * *